United States Patent [19]
Morris

[11] 3,722,293
[45] Mar. 27, 1973

[54] ACCELERATION SENSING SYSTEM

[75] Inventor: Harold D. Morris, Orinda, Calif.

[73] Assignee: Systron-Donner Corporation, Concord, Calif.

[22] Filed: July 11, 9169

[21] Appl. No.: 841,041

[52] U.S. Cl. ..................................................73/517 R
[51] Int. Cl. ..............................................G01p 15/08
[58] Field of Search................................73/516, 517

[56] References Cited

UNITED STATES PATENTS

| | | | |
|---|---|---|---|
| 2,682,003 | 6/1954 | Stubner | 73/517 |
| 2,814,768 | 11/1957 | Kinkel | 73/398 |
| 2,976,733 | 3/1961 | Litman et al. | 73/517 |
| 3,074,279 | 1/1963 | Morris | 73/517 |
| 3,209,601 | 10/1965 | Stiles | 73/517 |

*Primary Examiner*—Richard C. Queisser
*Assistant Examiner*—Herbert Goldstein
*Attorney*—Flehr, Hohbach, Test, Albritton & Herbert

[57] ABSTRACT

Acceleration sensing system having a servo accelerometer and multiplier in which the output of the accelerometer is filtered and supplied to the multiplier so that there is produced a d.c. output which is simultaneously proportional to the acceleration and an input variable d.c.

8 Claims, 1 Drawing Figure

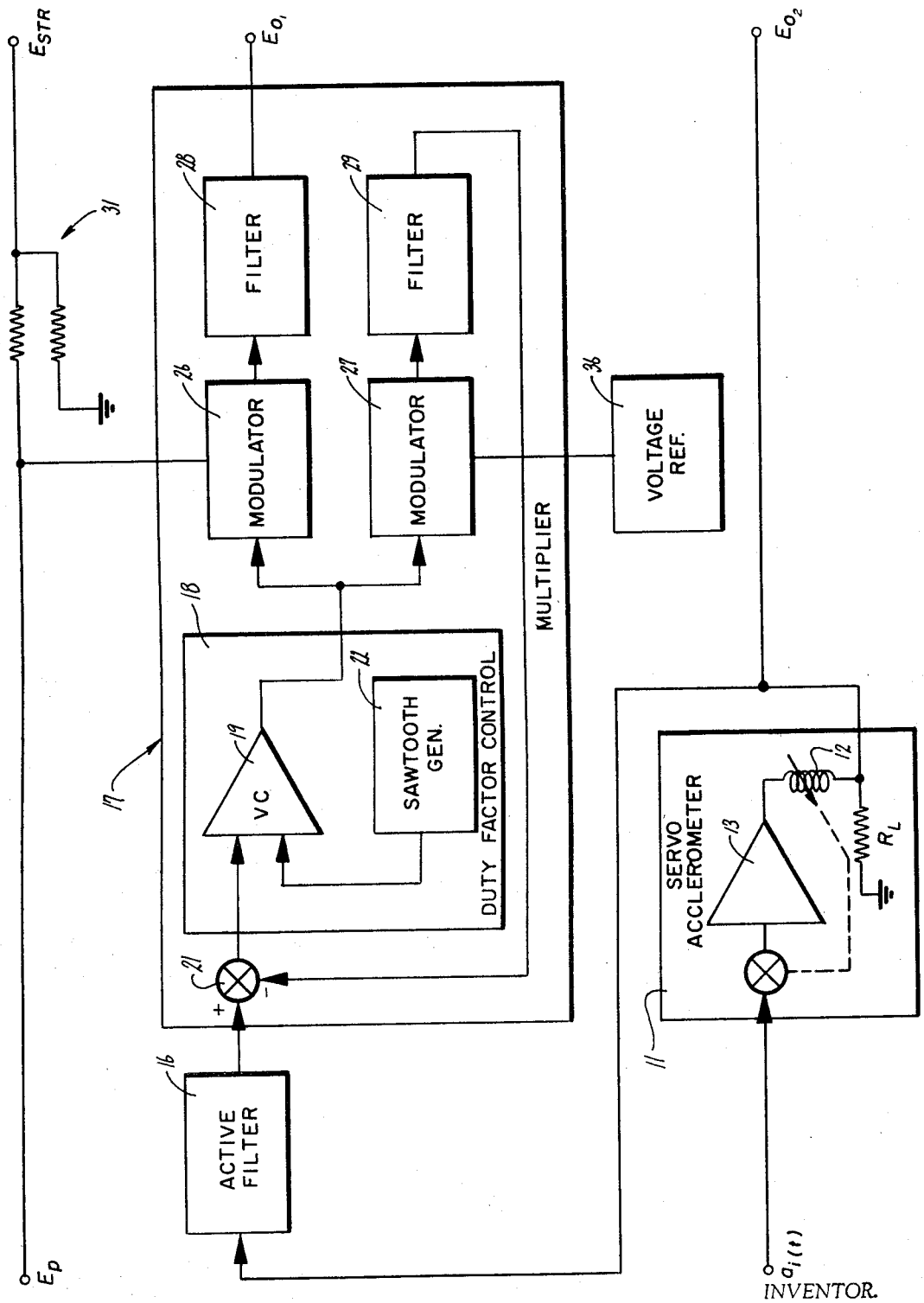

ACCELERATION SENSING SYSTEM

BACKGROUND OF THE INVENTION

Mechanical multiplying accelerometers have heretofore been provided. Such mechanical multiplying accelerometers utilize a mass spring system in which the arm of a potentiometer is physically moved up and down in accordance with acceleration. Such accelerometers have been very unsatisfactory and have created a great deal of trouble, particularly with respect to the wear of the arm of the potentiometer as it is moved up and down. There is, therefore, a need for a device which will overcome such deficiencies.

SUMMARY OF THE INVENTION AND OBJECTS

The acceleration sensing system consists of a servo accelerometer which has an output which is proportional to acceleration. Means is provided for filtering the acceleration output from the accelerometer. Multiplier means is connected to the filtering means and produces a d.c. output which is simultaneously proportional to the acceleration and to a variable input. The multiplier includes a duty factor control and a pair of modulators which receive the output from the duty factor control. A feedback loop is connected to the output of one of the modulators and to the duty factor control. The output of the other modulator provides the output for the system.

In general, it is an object of the present invention to provide an acceleration sensing system which is relatively trouble free.

Another object of the invention is to provide a system of the above character which can be utilized as a direct replacement for spring mass systems.

Another object of the invention is to provide a system of the above character which has great accuracy and which has extreme operating reliability.

Another object of the invention is to provide a system of the above character which can be readily produced.

Additional objects and features of the invention will appear from the following description in which the preferred embodiment is set forth in conjunction with the accompanying drawing.

BRIEF DESCRIPTION OF THE DRAWING

The drawing shows a block diagram of an acceleration sensing system incorporating the present invention.

DESCRIPTION OF THE PREFERRED EMBODIMENT

The acceleration sensing system shown in the drawing consists of a linear servo accelerometer 11 of the type described in U.S. Letters Pat. No. 3,074,279. As pointed out in said patent, the servo accelerometer utilizes a pendulous mass which is held in a predetermined position with respect to the case of the accelerometer by a force balance servo mechanism. Such an accelerometer also includes a torquer 12 which is positioned in a permanent magnet field and produces a torque directly proportional to the current through it. The position of the pendulous mass is sensed by the pick-off which forms part of an oscillator. The output from the oscillator is amplified by an amplifier 13 and produces an output voltage directly proportional to the displacement of the pendulous mass from its null position. This output voltage is supplied to an active filter 16. In addition, the acceleration output of the servo accelerometer 11 is supplied at a terminal $E_{o_2}$.

The operating range of the servo accelerometer can be any suitable range such as zero to +6 g. When zero g acceleration is being applied to the servo accelerometer 11, no torque or force is required to hold the pendulous mass in the null position, so the servo operates at null with no current flowing through the torquer 12 and the series load resistor $R_L$. When the accelerometer is accelerated, the pendulous mass begins moving away from its null position in a lagging direction, commanding the pick-off and the associated amplifier 13 to produce a restoring torque in the proper direction to oppose the torque resulting from the acceleration. The pendulous mass continues to move until a sufficiently large re-balance current and torque are produced to fully equal the input torque due to acceleration, at which point the motion of the pendulum ceases. The actual deflection of the pendulum at full scale input is very minute because of the very high loop gain of the servo so that the maximum deflection angle of the pendulous mass is 0.002 radians or approximately 7 arc minutes of angle. As a result of the tight servo control and small deflection angle of the pendulous mass, the response of the servo accelerometer to input accelerations applied at right angles to its true zero g sensitive axis is small. Since force balance is obtained in the servo accelerometer, the servo operates with almost ideal linearity of output versus input acceleration. The current which flows in the torquer is directly proportional to the applied acceleration and is used to produce a precise voltage representing the input acceleration by passing the servo current through the precision load resistor $R_L$. The total suspended mass in the servo accelerometer is very small and thus virtually eliminates any stress on the supporting bearings utilized in the accelerometer due to acceleration and vibration.

In order to provide maximum independence of the system during vibration, the range of the servo accelerometer can be chosen to be −10 g to +16 g so that vibration up to 10 g can be superimposed on any value between zero and 6 g (normal range input) without producing momentary or periodic saturation of the sensor with resulting errors in the output.

The normally high frequency response from the acceleration sensor which represents the output of the servo accelerometer 11 is bandwidth restricted to low frequency as, for example, 31 cps, by a low pass active filter 16 so that vibration noise output will be minimized thereby preventing vibration peaks from causing errors due to bottoming at zero g or exceeding 6 g of normal acceleration at the input to the multiplier 17. The filter can generally be of the type described in U.S. Letters Pat. No. 3,122,714. However, in place of the second order active filter which is disclosed in said U.S. Pat. No. 3,122,714, the filter is modified by adding an additional passive component in the form of a capacitor which is connected from the center of $R_2$ to ground to provide a third order active filter. Such a third order active filter is desirable to eliminate any frequencies in the output of the accelerometer which could interfere with the multiplying processes in the multiplier 17.

The corner frequency of 31 cps was chosen to provide a frequency response which would meet that for the spring mass sensor which had been heretofore utilized for this application. A wider band or a narrower band of frequency response can be easily provided by changing the values of the capacitive components associated with the active filter. The dynamic lag of the entire system is determined primarily by this filter 16. The use of such a filter is particularly advantageous because by utilizing an a.c. coupled amplifier, d.c. errors are not directly added into the output signal. For this reason, a very simple amplifier can be utilized which has no real requirement for temperature or time drift stability.

The output of the active filter 16 is supplied to a multiplier 17 which accepts the acceleration signal and produces an attenuation coefficient directly proportional to it over the specified zero to 6 g range of the servo accelerometer and supplies it at the output terminal $E_{0_1}$. The multiplier 17 accepts as a multiplicand a zero to +10 volts d.c. input signal from the terminal $E_P$ and provides the output signal $E_O$ which is equal to the input signal $E_P$ times the portion of 6 g being sensed by the servo accelerometer. This is expressed by the following equation:

$$E_{0_1} = (a_i/6\ g)\ E_P$$

where
$E_{0_1}$ = primary output voltage
$E_P$ = primary input voltage representing a desired scale factor
$a_i$ = input acceleration in g
$6\ g$ = full scale input acceleration From this equation, it can be seen that for an input acceleration, input of zero g, the output $E_{0_1}$ will be zero volts. For an input of 6 g, the output will be exactly equal to the primary input or, in other words, a 100 percent output.

The multiplier 17 consists of a duty factor control 18. The duty factor control 18 consists of a voltage comparator 19 which has two inputs. One of the inputs is connected from the output of a summing junction 21 and the other input is connected to the output of a sawtooth generator 22. The outputs of the duty factor control and of the voltage comparator 19 are connected to a pair of modulators 26 and 27. The outputs of the modulators are connected to filters 28 and 29. The output of the filter 28 is connected to the output terminal $E_O$, whereas the output of the filter 29 is connected through a feedback loop to the summing junction 21 which also receives an input from the active filter 16. The modulator 26 is connected to the input terminal $E_p$. The input terminal $E_p$ is connected through a divider 31 to the output terminal $E_{STR}$. A voltage reference 36 is connected to the modulator 27.

In general, the multiplier 17 acts as a duty factor modulator utilizing on-off electronic switches operating at a carrier frequency as determined by the sawtooth ramp generator 22. The sawtooth ramp generator 22 produces a periodic waveform to provide a desired carrier frequency as, for example, a carrier frequency of 2000 cps. The duty factor control 18 produces a squarewave of a constant frequency which has a percentage of up and down time which is controlled by a d.c. input voltage. In other words, if the high part of the squarewave is defined as the on time and the low part of the squarewave is defined as the off time, the sum of the on and off times is a constant.

The output of the sawtooth generator 22 is substantially larger than that of the signal which is supplied on the other input to the voltage comparator 19. Since this is the case, as the sawtooth signal moves back and forth with respect to the voltage which is applied on the other input of the voltage comparator, the output voltage from the comparator 19 will be a constant frequency squarewave whose percentage of "on" time out of the total time varies with the voltage supplied on the signal input. For example, if it is assumed that the output of the sawtooth generator goes from 0 to 10 volts in a linear fashion periodically, a voltage input of 3 volts on the other input to the voltage comparator will cause the output of the comparator to switch at the moment the voltage from the sawtooth generator exceeds 3 volts. With such an input voltage on the voltage comparator, for 30 percent of the total period, the output of the comparator will switch from on to off. The duty factor control thus operates at a constant frequency as, for example, 2000 cycles per second which is the frequency of the sawtooth generator 22 which causes the output of the voltage comparator 19 to switch on and off at the constant carrier frequency with the percentage of on time being the same percentage as the percentage of the input signal to the voltage comparator 19 is with respect to the output from the sawtooth generator 22. Thus, if the input signal is 3 volts and the maximum output from the sawtooth generator 22 is 10 volts, the voltage comparator 19 will be on for 30 percent of the time and if the voltage supplied to the voltage comparator 19 is 10 volts, it would be on 100 percent of the time. Thus, it can be seen that the duty factor control produces an output squarewave which can be utilized to drive electronic switches in the from of modulators 26 and 27.

The modulators 26 and 27 are switched between grounded and ungrounded positions at the carrier frequency determined by the frequency of the sawtooth generator 22. The outputs of the modulators 26 and 27 will be squarewaves, each with an amplitude equal to its reference input voltage.

The system operates as a closed loop feedback system to control the amount of time that the modulator 27 is in one of its two conditions so that its output averages exactly the voltage which is being produced by the servo accelerometer. The modulator 27 utilizes as a reference the voltage reference 36 which is precisely adjusted to produce a voltage which is equivalent to an acceleration of 6 g, in other words, the upper limit of the range for the servo accelerometer 11.

This same information is utilized to operate the modulator 26 which serves as a second electronic switch. The modulator 26 utilizes as its reference the input voltage $E_p$ which is connected to filter 28 for a portion of the total time exactly equal to the duty factor produced by the duty factor control. This effectively produces a constant frequency series of pulses whose width is proportional to acceleration and whose height is equal to $E_p$. Modulator 26 thus produces an average voltage of a very precise nature which is linearly proportional to both the acceleration and the primary input, $E_p$. When this is true, the duty factor or the ratio of on time to off time of the modulator 27 is linearly and directly proportional to the output of the servo accelerometer 11. In other words, the on and off control signal supplied by the voltage comparator 19 precisely repeats in duty factor the analog voltage output of the servo accelerometer 11.

As pointed out previously, the outputs of the modulators 26 and 27 are filtered by the filters 28 and 29. The filters 28 and 29 are preferably matched second order active filters of the type described in U.S. Letters Pat. No. 3,122,714. The output from the lower filter 29 is compared with the signal from the servo accelerometer 11 in the summing junction 21 and any error which is produced is amplified if necessary and is then utilized for biasing the voltage comparator 19 in the manner hereinbefore described.

A resistive divider 31 is connected to the input terminal $E_p$ and the output terminal $E_{STR}$. It is used for testing the function of the multiplier 17 by applying a known fixed input to the multiplier and comparing the output to ascertain whether the attenuation coefficient of the multiplier is the same as that of the divider 31.

To facilitate explanation of the operation of the multiplier 17, let it be assumed the input acceleration signal is 6 g and that the modulator 27 is on all the time, which means that the output from the filter 29 would be exactly equal to the 6 g signal from the servo accelerometer. This would mean that the error signal from the summing junction 21 would be zero and thus the duty factor controller 18 would continue producing the assumed 100 percent duty factor. This would keep the modulators 26 and 27 on all the time and provide an output signal on the output terminal $E_{0_1}$ equivalent to an acceleration of 6 g, or 100 percent of $E_p$.

Now let it be assumed that the acceleration drops to zero g. When this is the case, the error signal from the summing junction 21 would be very large and would command the duty factor controller 18 to drop to zero percent duty factor. This would cause the modulators 26 and 27 to be turned off all the time causing the output from the filters 28 and 29 to be zero.

From the foregoing, it can be seen that the lower feedback loop serves to automatically keep equality between the two inputs to the input summing junction 21. This means that the output of the modulator 27, when averaged by the filter 29, is continuously equal to the output of the servo accelerometer 11. In other words, the lower feedback loop produces a precise duty factor linearly proportional to the voltage input to the multiplier 17 which is, in turn, proportional to the acceleration output from the servo accelerometer 11.

This duty factor control can be utilized for driving the other modulator 26 which is identical to the modulator 27. This second modulator can be utilized for multiplying the primary input $E_p$ by the duty factor produced by the duty factor control which, when filtered, will produce a steady output voltage $E_0$ which is linearly proportional to the duty factor times the primary input. Since the duty factor itself is proportional to acceleration, the primary output is proportional to the linear product of the acceleration times the primary input.

From the forgoing, it can be seen that there has been provided a unique acceleration sensing system which has a dual output capability in that it provides both a multiplied signal (primary output) as well as a direct signal from the acceleration sensor (secondary output). With such a system, it can be seen that it is unnecessary to utilize any moving contacts, wiper elements or flexure-supported seismic systems. The multiplier can be formed completely of solid state elements.

The acceleration sensing system is one which can be utilized to replace a potentiometric accelerometer in terms of overall function. In addition, it is far more precise than a potentiometric accelerometer and has the same transfer function. In addition, its technical specifications and characteristics far exceed those of potentiometric accelerometers. The acceleration sensing system includes means which makes it possible to provide an ultra-linear duty factor control. Since the duty factor control is the result of a servo loop, this makes it possible to multiply with great accuracy in a time division method. The system utilizes one closed loop and an open loop in which the open loop is directly controlled by the closed loop.

Since the two electronic modulators which are utilized in the system are identical in character, any characteristics of one will be compensated for by the other. Thus, even if there are imperfections in the modulators, they will be balanced between the two to make possible almost ideal multiplication. The two filters also compensate for each other so that the lower servo loop produces whatever signal is necessary at the duty factor control to cause the output of the lower filter to equal the input. This means that the duty factor control signal actually leads in phase the signal from the accelerometer and, in effect, accomplishes compensation of the time lag in the upper filter.

I claim:

1. In an acceleration sensing system, means for sensing dynamic acceleration and having an output on which there appears a varying output signal which follows the dynamic acceleration to represent the dynamic acceleration, an input terminal for receiving an input signal representing the desired scale factor, for supplying a reference representing full scale input acceleration and electronic means having first, second and third inputs and an output with the first input being coupled to the input terminal, the second input being coupled to the output of the means for sensing acceleration for multiplying the varying input signal by the varying output signal from the means for sensing acceleration and the third input being coupled to the means for supplying a reference to provide a combined output signal on the output which is inversely proportional to the reference linearly proportional to the input signal appearing on the input terminal and linearly proportional to the varying output signal of the means for sensing acceleration.

2. An acceleration sensing system as in claim 1 wherein said electronic means for multiplying includes first and second channels having matched elements with each channel having an input and an output, means coupling the varying output signal representing acceleration and the output of the second channel to provide an error signal representing the difference between the varying output representing acceleration and the output from the second channel to the inputs of the first and second channels to control the channels.

3. A system as in claim 2 together with a reference coupled to said second channel and wherein said input terminal is coupled to the first channel.

4. In an acceleration sensing system, means for sensing acceleration and having an output on which there appears an output signal representing acceleration, an input terminal for receiving an input signal representing the desired scale factor, means supplying a reference representing full scale input acceleration and electronic means having first, second and third inputs and an output with the first input being coupled to the input terminal, the second input being coupled to the output of the means for sensing acceleration for multiplying the input signal by the output signal from the means for sensing acceleration and the third input being coupled to the means for supplying a reference to provide a combined output signal which is linearly proportional to the signal on the output appearing on the input terminal and which is also linearly proportional to the output of the means for sensing acceleration, said means for multiplying including a duty factor control having an input coupled to the output of the means for sensing acceleration and having an output, said duty factor control being responsive to acceleration with a duty cycle proportional to acceleration, first and second modulators each having first and second inputs and an output, means coupling said first inputs to the output of the duty factor control, means coupling the second input of the first modulator to the input terminal, means coupling the second input of the second modulator to the reference, means coupling the output of the first modulator to the duty factor control, the combined output signal appearing on the output of the first modulator inversely proportional to the reference, linearly proportional to the input signal appearing on the input terminal and linearly proportional to the varying output signal of the means for sensing acceleration.

5. A system as in claim 4 together with an electronic active filter connected to the output of the means for sensing acceleration to filter the output signal before it is supplied to the multiplying means.

6. A system as in claim 4 wherein said duty factor control includes a voltage comparator having first and second inputs and an output, means supplying a periodic waveform to one of the inputs, and means coupling the other of the inputs to the output of the means for sensing acceleration and the output of the second modulator.

7. A system as in claim 4 together with means for filtering the output from the modulators.

8. A system as in claim 4 wherein said modulators are substantially identical to each other together with substantially identical filtering means for filtering the outputs of the modulators so that the outputs are substantially identical to each other.

* * * * *